United States Patent [19]

Stout

[11] 3,942,011
[45] Mar. 2, 1976

[54] GAMMA CAMERA DISPLAY SYSTEM
[75] Inventor: Karl J. Stout, Hudson, Mass.
[73] Assignee: Raytheon Company, Lexington, Mass.
[22] Filed: Dec. 23, 1974
[21] Appl. No.: 535,892

Related U.S. Application Data
[63] Continuation-in-part of Ser. No. 418,157, Nov. 21, 1973.

[52] U.S. Cl. .............................. 250/363 S; 250/369
[51] Int. Cl.² ........................................ G01T 1/164
[58] Field of Search .................... 250/363 S, 369

[56] References Cited
UNITED STATES PATENTS

| | | |
|---|---|---|
| 3,573,458 | 4/1971 | Anger ................................ 250/369 |
| 3,732,419 | 5/1972 | Kulberg et al. .................. 250/363 S |
| 3,752,981 | 8/1973 | Jaszczak .......................... 250/363 S |
| 3,777,146 | 12/1973 | Brunnett et al. ................. 250/363 S |

*Primary Examiner*—Archie R. Borchelt
*Attorney, Agent, or Firm*—David M. Warren; Joseph D. Pannone; Milton D. Bartlett

[57] ABSTRACT

In a gamma camera having an array of photomultipliers coupled via pulse shaping circuitry and a resistor summing and weighting circuit to a display for forming an image of a radioactive target, the improvement being a modulation circuit for reducing the intensity of points on the display located at positions corresponding to positions of the photomultipliers for removing an apparent image of the array.

4 Claims, 7 Drawing Figures

| TERMINALS | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| X COMBINER | NC | 12 + | 6 + | 12 + | 12 − | 6 − | 12 − | 6 + | 4 + | 3 + | 4 + | 6 + | NC | 6 − | 4 − | 3 − | 4 − | 6 − | NC |
| Y COMBINER | NC | 12 + | NC | 12 − | 12 − | NC | 12 + | 6 + | 12 + | NC | 12 − | 6 − | 6 − | 6 − | 12 − | NC | 12 + | 6 + | 6 + |
| Z COMBINER | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − |
| E COMBINER | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − | 6 − |

GAMMA CAMERA DISPLAY SYSTEM

CROSS REFERENCE TO RELATED APPLICATION

This is a continuation in part of application Ser. No. 418,157 filed Nov. 21, 1973.

BACKGROUND OF THE INVENTION

Cameras utilized in providing an image of a radioactive source are frequently composed of a scintillator crystal and a collimator for guiding radiant energy from the source to the scintillator crystal. An array of photomultipliers is positioned on the opposite side of the scintillator crystal for receiving flashes of light emitted by the crystal in response to the incident radiant energy. Typically, the measure of light energy received by each photomultiplier is obtained by integrating circuits coupled to each of the photomultipliers, the relative magnitudes of these energies serving to indicate the location of each of the light flashes on the crystal. The stored energy of each of the photomultipliers is converted to a signal suitable for combining with the signals obtained from the energies of the other photomultipliers. Weighting circuitry is utilized in the combining of these signals to provide points on a display, such as a cathode-ray tube display, which correspond to the points of illumination upon the scintillation crystal. A circuit having an electronic window frequently referred to as a pulse height analyzer, is utilized in the coupling of these signals from the photomultipliers to the display to ensure that only signals having an energy within a prescribed range of energies are coupled to the display.

A problem arises in that the photomultipliers are often placed close to the scintillator to maximize the resolution of the camera; however, the close spacing causes an increased density of signals on the display emanating from light flashes directly in front of a photomultiplier than from light flashes occurring to the side of the photomultiplier. As a result, a radiographic image appearing on the display has an appearance which is modified somewhat from the appearance of the subject due to the fact that there is a greater density of points on the display at positions corresponding to the positions of the photomultipliers in the array of the photomultipliers. There is an apparent visual effect perceived by an observer of the image which shows an outline of the array of photomultipliers superposed upon the image of the subject.

SUMMARY OF THE INVENTION

The foregoing problems are overcome and other aspects of the invention are provided by a gamma camera incorporating an electronic system in accordance with the invention wherien each photomultiplier is provided with its own integrator and pulse shaping circuit for providing signals having waveforms suitable for high resolution imaging. These pulse signals are combined in a pair of summing circuits through scaling resistors of suitable values in accordance with the positions of the photomultipliers in the array to provide X and Y coordinate values of the positions of successive incidences of gamma ray photons. The signals of the pulse shaping circuits are further combined to provide a measure of the total energy of the incident gamma ray photons, each of these measures being applied to a pulse height analyzer circuit which is utilized for operating a sampling circuit to sample only such ones of the X and Y coordinate signals as result from gamma photons of suitable energy. The Z axis of the display is modulated in a novel fashion by means of a circuit which varies the intensity of points appearing on the display. The modulation is accomplished by generating a fixed amplitude gate signal triggered by the pulse height analyzer, and subtracting from the gate signal a signal proportional to the sum of the pulse shaping signals.

BRIEF DESCRIPTION OF THE DRAWINGS

The aforementioned features and other advantages of the invention are explained in the following description taken in connection with the accompanying drawings wherein.

DESCRIPTION OF THE PREFERRED EMBODIMENT

Figure 1:
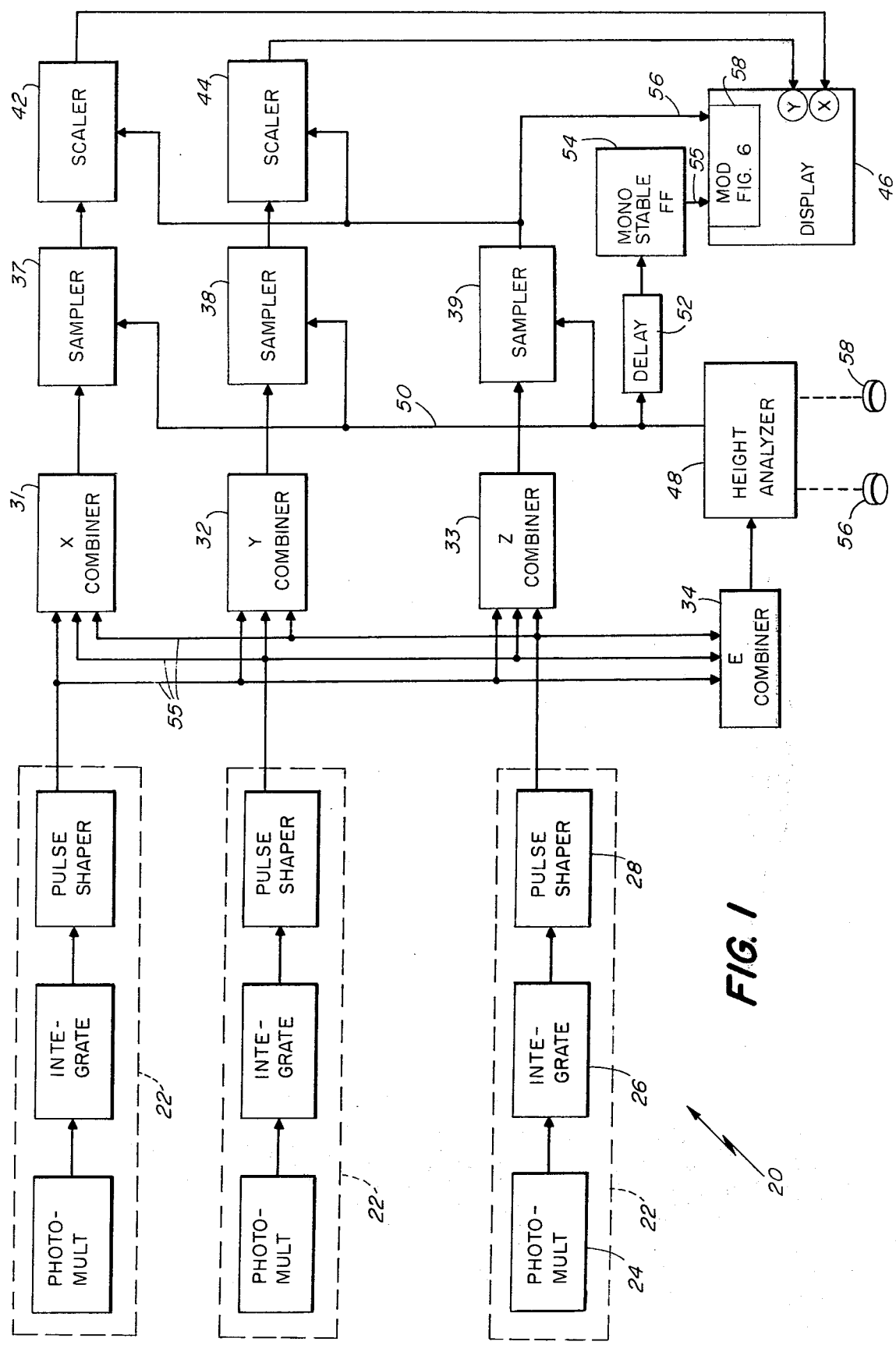
FIG. 1 is a block diagram of the camera system in accordance with the invention.

Referring now to FIG. 1, there is shown a block diagram of the electrical portion of a camera system 20 which comprises a plurality of channels 22, each channel 22 comprising a photomultiplier 24, an integrator 26, and a pulse shaper 28. Each of the channels 22 is coupled to four combiners 31–34, the combiners 31–33 being coupled respectively to samplers 37–39. Output signals of the samplers 37 and 38 are scaled by scalers 42 and 44 and are applied respectively to the X and Y terminals of a display 46. The output of the combiner 34 is coupled to an analyzer 48 which analyzes the pulse height of signals from the combiner 34, the output of the analyzer 48 being applied along line 50 to trigger the samplers 37–39 as well as being coupled via a delay unit 52 for triggering a monostable flip-flop 54. The flip-flop 54 provides a gate signal along line 55 to the display 46 for illuminating the display 46 after the signals in the samplers 37–38 have been scaled by the scalers 42 and 44. The output of the sampler 39 is coupled via line 56 to the scalers 40 and 42 as well as to a modulator 58 of the display 46 which, as will be described with reference to FIG. 6, modulates the intensity of points on the display 46 in accordance with the invention to remove the superposed image of the array of photomultipliers 24.

In operation, the electrical portion of the camera system 20 provides for an image on the display 46 related to the signals provided by the photomultipliers 24 in each of the channels 22 in the following manner. In each channel 22, the photomultiplier 24 provides a series of pulse signals corresponding to individual flashes of light incident upon the photomultiplier 24, a series of these flashes of light being produced in response to a single gamma ray photon or x-ray photon impinging upon a scintillator crystal, to be described with reference to FIG. 2, which is placed in front of the photomultipliers 24. The series of the light flashes represent the energy transferred from the gamma ray photon to the scintillator crystal and, accordingly, the signals provided by the photomultiplier 24 in response to each of the light flashes are summed together by means of the integrator 26 to provide a measure of the energy of a gamma ray photon or x-ray photon impinging upon the scintillator crystal.

The pulse shaper 28 receives a signal voltage from the integrator 26 and converts it into a pulse having a duration very much shorter than the integration time of the integrator 26, and having an amplitude proportional to the peak voltage of the signal voltage of the integrator 26. The waveforms of the pulses of the pulse shapers 28 in each of the channels 22 are suitable for being arithmetically combined for providing information with respect to the position of an impact of a gamma ray photon upon the scintillator crystal.

Figure 2:
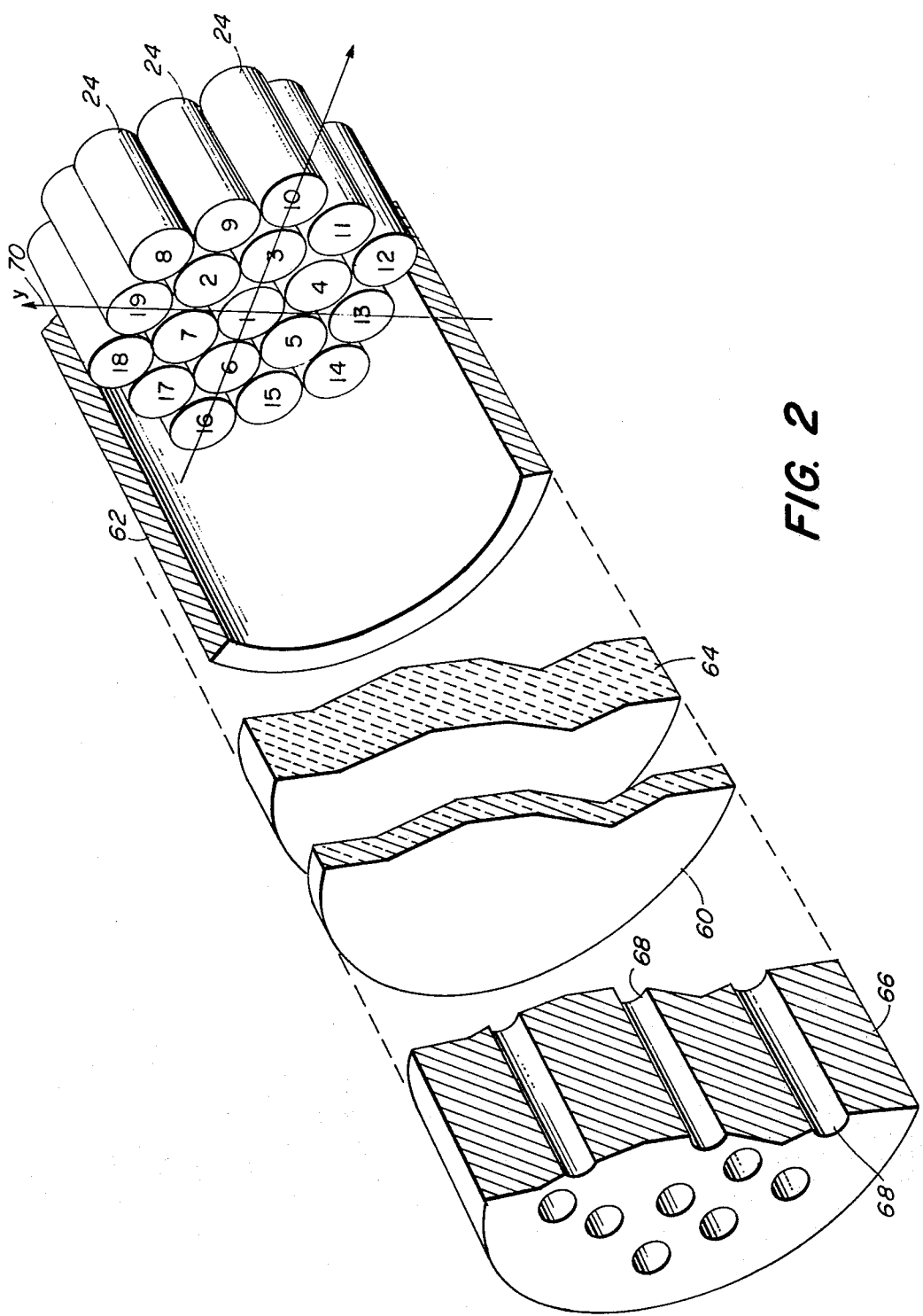
FIG. 2 is an exploded view of an assembly of the photomultipliers referred to in FIG. 1 showing the position of the photomultipliers in relation to a scintillator crystal and a collimator.
Figure 3:
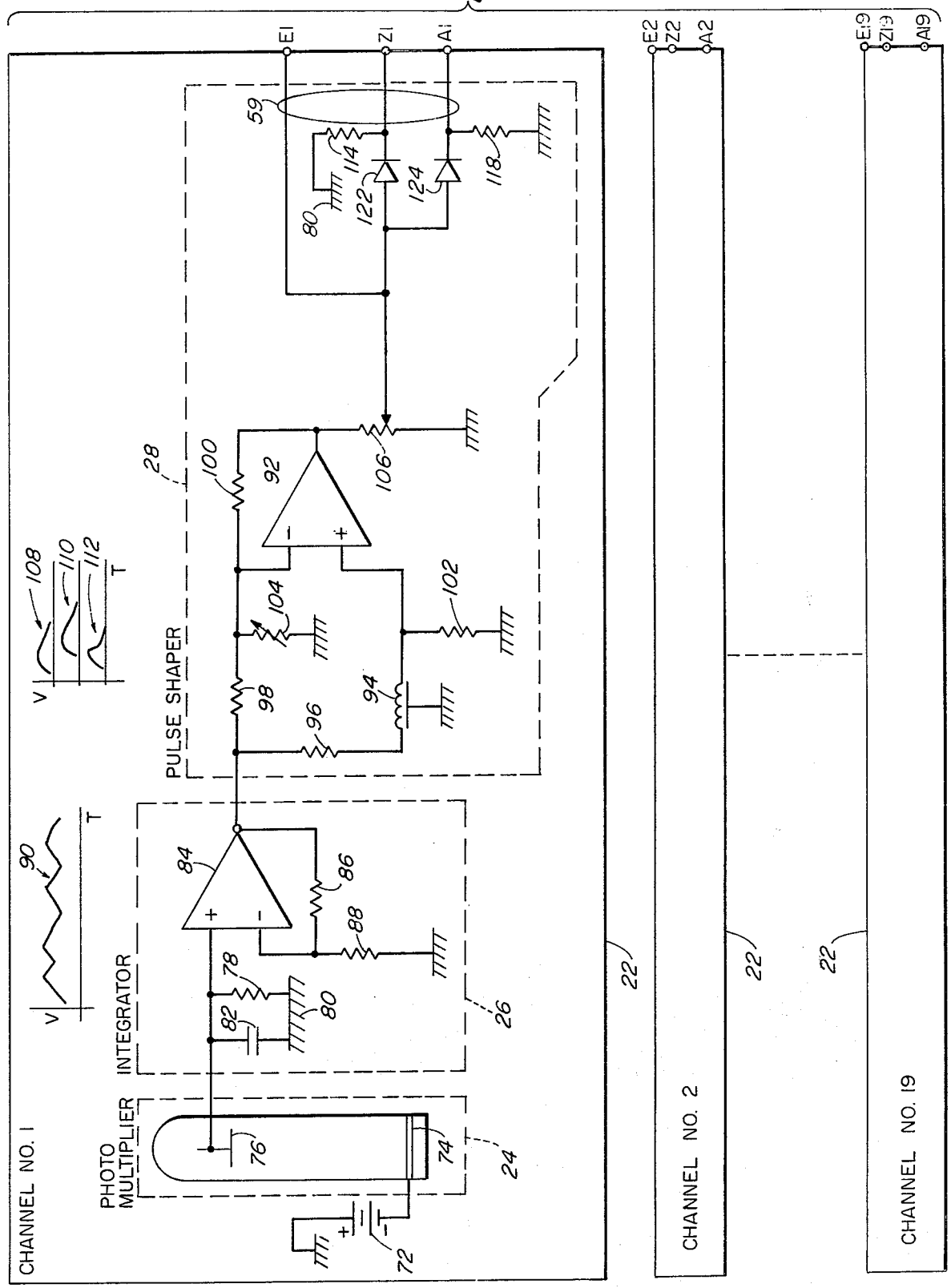
FIG. 3 is a schematic diagram of the electrical circuitry utilized in an integrator and a pulse shaper referred to in FIG. 1.
Figures 4, 5:
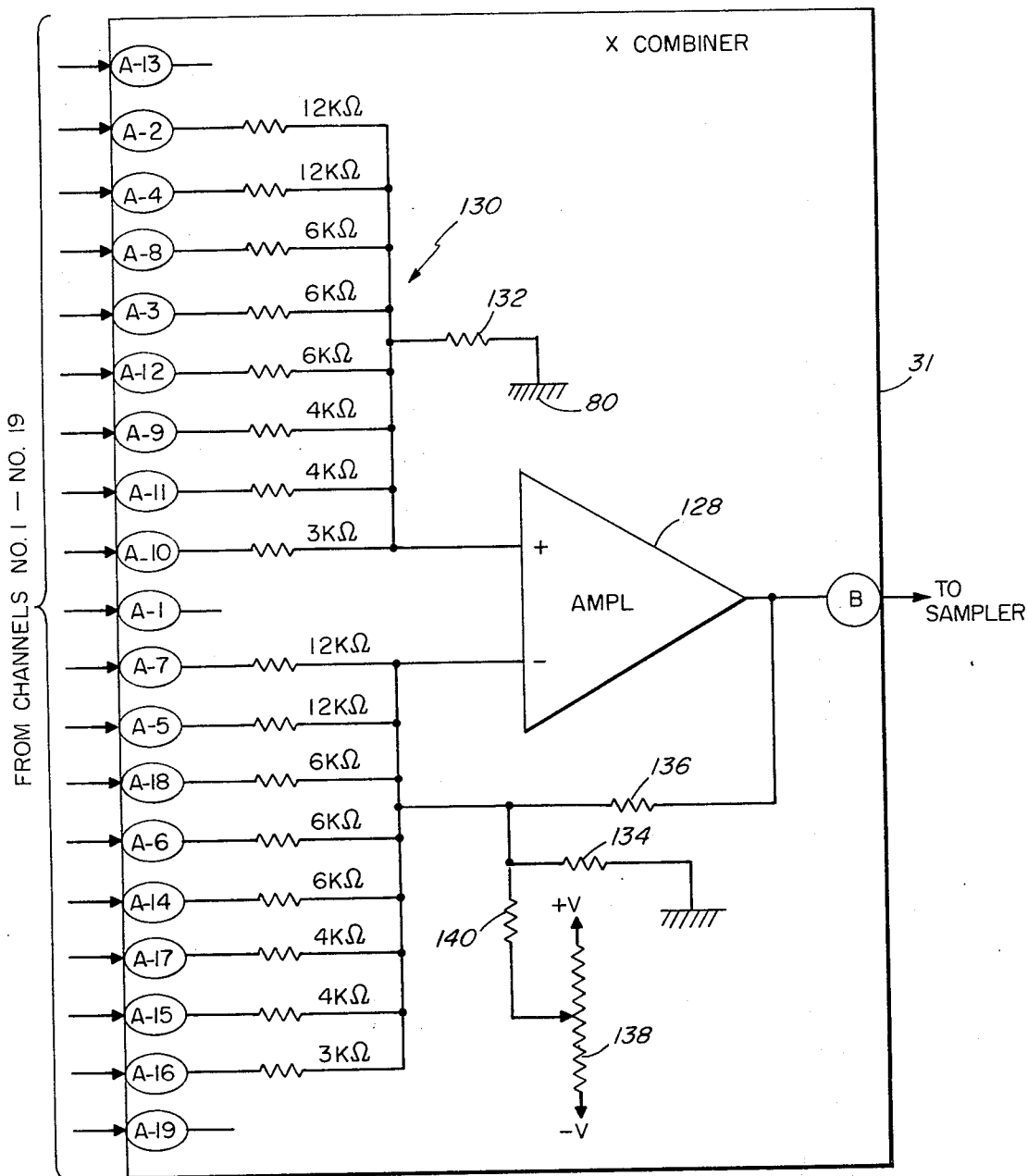
FIGS. 4 and 5 show, respectively, a circuit for combining the pulse signals and a table of resistor values for scaling these signals for the combiner circuits of FIG. 1.

Each of the pulse shapers 28 is coupled to each of the combiners 31–34 via lines 59 as shown in FIG. 1, with more precise details of the coupling to be seen in FIGS. 3 and 4 which show that each pulse shaper 28 has three outputs which are coupled in a prescribed manner to the respective combiners 31–34. The combiners 31–34 as will be seen in FIG. 4, are provided with scaling resistors for scaling the contributions of the pulse shapers 28 in accordance with the geometry of the photomultipliers 24, as will be seen in FIG. 2, to provide signals representing the X component and the Y component of the location of an impact of a gamma ray photon upon the scintillator crystal, the combiner 31 providing the X component and the combiner 32 providing the Y component. The combiner 33 provides a measure of the total energy received by all of the photomultipliers 24 which is used for scaling the X component and the Y component signals by a factor which compensates for irregularities in the scintillator crystal. The combiner 33 may be provided with variable scaling resistors which are useful for aligning the system 20 to minimize any distortion appearing in the image on the display 46.

The image on the display 46 is further enhanced by means of the combiner 34 and the analyzer 48, the combiner 34 functioning in a manner similar to that of the combiner 33 to provide a measure of the total energy received by the photomultipliers 24. The analyzer 48 is a well-known pulse height analyzer which provides the aforementioned signal on line 50 in response to signals from the combiner 34 only when the signals indicate that the energy of an impinging gamma ray photon is in excess of a preset minimum energy level and less than a preset maximum energy level, these energy levels being set by the knobs 56 and 58. The samplers 37–39 are triggered in response to the signal on line 50 and provide a sample of the voltages appearing at the outputs of the combiners 31–33, these samples having a duration sufficient to permit the multiplication operation of the scalers 42 and 44. Each of the scalers 42 and 44 are commercially available multiplying units such as that of "Intronics," Model No. 505; the scaler 42 multiplies the output of sampler 37 by the reciprocal of the output of the sampler 39, and the scaler 44 multiplies the output of the sampler 38 by the reciprocal of the output of the sampler 39. The values of the signals from the samplers 37–39 are equal to the values of the signals from the combiners 31–33 which are provided in accordance with the values of the scaling resistors as will be described with reference to FIG. 4.

Referring now to FIG. 2, there is shown an array of the photomultipliers 24 with individual ones of the photomultipliers 24 being numbered to identify their location in the array. The central photomultiplier 24 is numbered 1, the photomultipliers of the inner hexagon are numbered 2 through 7, and the photomultipliers of the outer hexagon are numbered 8 through 19. Also shown in FIG. 2 is a scintillator 60 in the form of a crystal of a material which emits light in response to excitation by high energy radiation, such a material being, for example, sodium iodide with thallium doping. The scintillator 60 is supported in relation to the photomultipliers 24 by means of a housing 62 and spaced from the front faces of the photomultipliers 24 by means of a light pipe 64 which is preferably of a material such as Lucite having a refractive index of approximately 1.5 to match the optical impedance of the scintillator 60 to the front faces of the photomultipliers 24. A collimator 66 having parallel passages 68 for conducting high energy photons to the scintillator 60 is positioned in front of the scintillator 60 by means of the housing 62 and oriented in the direction of a source (not shown) of high energy radiation. High energy photons emitted from the source in the direction of the axis of the collimator 66 pass through the passages 68 to illuminate the scintillator 60 in a pattern corresponding to the form of the source. Photons incident upon the collimator 66 in a non-axial direction are substantially absorbed in the material, preferably lead, from which the collimator 66 is fabricated.

A reference frame 70 having an X coordinate axis and a Y coordinate axis may be positioned anywhere upon the array of photomultipliers 24 but is conveniently centered upon the array of photomultipliers 24 such that the Y axis passes through the photomultipliers numbered 19, 1 and 13 while the X axis passes through the photomultipliers numbered 10, 3, 1, 6 and 16. With respect to the X axis combiner 31 of FIG. 1, the signals derived from the photomultipliers are suitably scaled or weighted in accordance with their respective distances from the Y axis. Similarly, with respect to the Y coordinate combiner 32 of FIG. 1, the signals derived from the photomultipliers 24 are suitably scaled or weighted in accordance with their respective distances from the X axis. These weightings will be described subsequently with reference to the table in FIG. 5. While various spacings between the scintillator 60 and the array of photomultipliers 24 may be utilized, it has been found that a spacing in the range of approximately one-half diameter to one diameter of a photomultiplier 24 is most advantageous for providing a sharp image on the display 46 of FIG. 1.

Referring now to FIG. 3, there is shown a schematic diagram of the circuitry in one of the channels 22 of FIG. 1, it being understood that the circuitry is the same in each of the channels 22. There are 19 of the channels corresponding to each of the 19 photomultipliers 24 of FIG. 2. Each channel 22 is seen to have three outputs labeled with the letters A, E and Z, these terminals being further designated by the numerals 1–19 when it is desired to designate the terminals of a specific one of the channels 22. The terminals A are coupled to the combiners 31 and 32 while the terminals Z are coupled to the combiner 33 and the terminals E are coupled to the combiner 34 in accordance with the interconnections to be seen in FIGS. 4 and 5.

Each photomultiplier 24 is energized by a source of electrical power shown as a battery 72 and has its photoelectric electrode 74 being connected to the negative terminal of the battery 72 while the anode 76 of the photomultiplier 24 is connected via a resistor 78 and ground 80 to the positive terminal of the battery 72. A capacitor 82 is connected in parallel with the resistor 78.

The capacitor 82 serves as the integrating element in the integrator 26 with the resistor 78 providing a discharge path for charge stored within the capacitor 82. It is noted that by grounding the positive terminal of the battery 72 and coupling the integrating capacitor 82 and the resistor 78 between the anode 76 and ground 80, there is provided a substantial reduction in any noise voltage which might appear across the terminals of the capacitor 82. Due to the fact that the output impedance of the photomultiplier 24 is relatively high while the input impedance of the pulse shaper 28 is relatively low, an amplifier 84 with resistor 86 and 88 coupled thereto is connected between the capacitor 82 and the pulse shaper 28 for impedance matching purposes. A terminal of the capacitor 82 is connected to the plus input terminal of the amplifier 84 while the resistor 88 is coupled between the minus input terminal of the amplifier 84 and ground 80. Resistor 86 serves as a feedback path between the output of the amplifier 84 and its minus input terminal.

Typical voltage waveforms appearing across the terminals of the capacitor 82 as well as at the output of the amplifier 84 are shown in graph 90. The vertical axis labeled V represents the voltage while the horizontal axis labeled T represent time. It is seen that the voltage builds up repetitively at a rate depending on the rate of light flashes produced by the scintillator 60 of FIG. 2 and, between successive rises of the voltage is seen to discharge exponentially with a time constant given by the product of the capacitance of the capacitor 82 and the resistance of the resistor 78. In particular, it is noted that the shape of the waveform varies with a dependence on the interval between successive impacts of gamma ray photons upon the scintillator 60 of FIG. 2.

The pulse shaper 28 is seen to comprise an amplifier 92, a delay line 94 and resistors 96, 98, 100, 102 and 104, the latter resistor being variable. A potentiometer 106 is also provided for varying the magnitude of the voltage provided by the pulse shaper 28. Two branches are provided, the upper branch comprising resistors 98 and 104 and the lower branch comprising resistors 96, delay line 94 and resistor 102. In the upper branch, the signal is coupled via resistor 98 to the minus terminal of the amplifier 92, this signal being seen in graph 108. A signal coupled in the lower branch via the resistor 96 and the delay line 94 to the positive terminal of the amplifier 92 is seen in the graph 110. It is noted that the signal on graph 110 is delayed relative to the signal shown in graph 108, the delay being equal to the delay of the delay line 94. The difference between these two signals appears at the output of the amplifier 92 and is shown in graph 112. It is thus seen that the signal in the graph 112 is a pulse having a width much narrower than the discharge time of the capacitor 82 of the integrator 26. The resistor 100 serves as a feedback path between the output of the amplifier 92 and the minus terminal thereof, the variable resistor 104 in conjunction with the resistor 100 serving as a means for varying the gain of the pulse shaper as well as for balancing the magnitudes of the signals applied to the plus and minus terminals of the amplifier 92 to maintain the baseline. The pulse shaper 28 further comprises resistors 114 and 118, and diodes 122 and 124 to attenuate low amplitude noise fluctuations.

While a battery 72 of fixed voltage is shown, it is advantageous to use a variable voltage source in which the voltage is adjusted to provide a predetermined value of signal in the output of the E combiner 34 when the photomultipliers 24 are activated in response to a specific isotope. This provides a normalization of the system 20 for specific isotopes so that the threshold of the discriminator 30 is always at optimal value. In addition, the multiplying factors in the scalers 42 and 44 of FIG. 1 vary within a predetermined range of magnitudes thereby permitting optimum operation of the scalers 42 and 44.

Referring now to FIGS. 4 and 5, there are shown respectively a block diagram of the combiner 31 of FIG. 1 and a table showing the values of the summing resistors which serve to scale or weight the signals from the channels 22, the table having four rows corresponding respectively to the resistor values of the combiners 31, 32, 33 and 34. The circuitry configurations for each of the four combiners 31–34 are identical; accordingly, only the circuit of the combiner 31 is shown in the figures. As has been mentioned hereinbefore, the X coordinate combiner 31 and the Y coordinate combiner 32 are each coupled to the terminals A1–A19 of the channels 22 while the Z combiner 33 and the E combiner 34 are coupled respectively to the terminals Z1–Z19 and E1–E19 of the channels 22.

The combiner 31 is seen to comprise an amplifier 128, summing resistors 130, a resistor 132 coupling the plus terminal of the amplifier 128 to ground 80, a resistor 134 coupling the minus terminal of the amplifier 128 to ground, a feedback resistor 136 coupling the output terminal of the amplifier 128 to its minus input terminal for setting the gain of the amplifier 128, and a potentiometer 138 coupled between a positive and a negative source of voltage and coupled to the minus terminal of the amplifier 128 by a resistor 140 for providing an adjustable voltage offset. While there are 19 terminals, A1–A19, only 16 summing resistors 130 are provided for the combiner 31, there being no connection to the terminals A1, A13 and A19, this being indicated by the letters NC in the first row of FIG. 5. The reason for the lack of connection to the terminals A1, A13 and A19 is apparent from the arrangement of the photomultipliers 24 in FIG. 2 wherein it is seen that the correspondingly numbered photomultipliers 24 are located on the Y axis and, accordingly, get a zero weighting with respect to determining position in the direction of the X axis.

Referring to the second row of the table in FIG. 5, it is noted that in the Y combiner 32, there is no connection provided by the signals of five of the photomultipliers 24 and their correspondingly numbered terminals, these being the terminals 1, 3, 6, 10 and 16, the lack of connection being shown in the second row of the table of FIG. 5, the lack of connection being due to the fact that, as is shown in FIG. 2, these five photomultipliers are located on the X axis and, therefore, make no contribution to displacements in the direction of the Y axis.

The values of the summing resistors 130 are in inverse relationship to the distances of the corresponding photomultipliers 24 from a coordinate axis of the reference frame 70 of FIG. 2. Thus, for example, the photomultipliers 24 numbered 2, 4, 5 and 7 are given a value of 12 kilohms in the X combiner 31 since their centers are spaced a half diameter from the Y axis. The photomultipliers 24 numbered 8, 3, 12, 14, 6 and 18 have corresponding resistance values of 6 kilohms in the X combiner 31 since these photomultipliers have their centers spaced one diameter from the Y axis. The photomultipliers 24 numbered 9, 11, 15 and 17 are provided with resistors having values of 4 kilohms in the X combiner 31 since these photomultipliers have their centers spaced one and one-half diameters from the Y axis. And, finally, the photomultipliers 10 and 16 have their corresponding resistors being valued at three kilohms in the X combiner 31 since these photomultipliers 24 have their centers spaced at a distance of two diameters from the Y axis. Similar comments apply to the resistors of the Y combiner 32 as shown in the second row of the table in FIG. 5 since the photomultipliers 24 numbered 17, 7, 2, 9, 11, 4, 5 and 15 are spaced at one-half the distance from the X axis of the photomultipliers 18, 19, 8, 12, 13 and 14.

With respect to the combiner 31 of FIG. 4, all of the summing resistors 130 corresponding to photomultipliers 24 of FIG. 2 which are located to the right of the Y axis are coupled to the plus input terminal of the amplifier 128 while the summing resistors corresponding to photomultipliers 24 located to the left of the Y axis are coupled to the minus input terminal of the amplifier 128. This is indicated in the first row of the table of FIG. 5 wherein plus signals are positioned beneath the resistance value for the resistors coupled to the terminals 2–4 and 8–12 while minus signs are positioned beneath the resistance values for the resistors coupled to the terminals 5–7 and 14–18. Similarly, in the second row of the table of FIG. 5, plus and minus signs are positioned beneath the resistance values to indicate that the corresponding resistors are coupled to either the plus or minus input terminals of the amplifier 128. With respect to the Z combiner 33 and the E combiner 34, all of these summing resistors 130 are coupled to the minus input terminal of the amplifier 128, the plus input terminal being grounded via resistor 132. Variable summing resistors may be utilized for the Z and E combiners 33 and 34, if desired, for more precise adjustment of the weightings accorded the signals from the various photomultipliers 24 to minimize the effects of barrel distortion and nonlinearities in the scintillator 60 to provide a more uniform image on the display 46 of FIG. 1. Also, the potentiometer 106 of FIG. 3 may be utilized in each channel 22 for adjusting its gain to eliminate the effects of barrel distortion from the image on the display 46.

Figure 6:
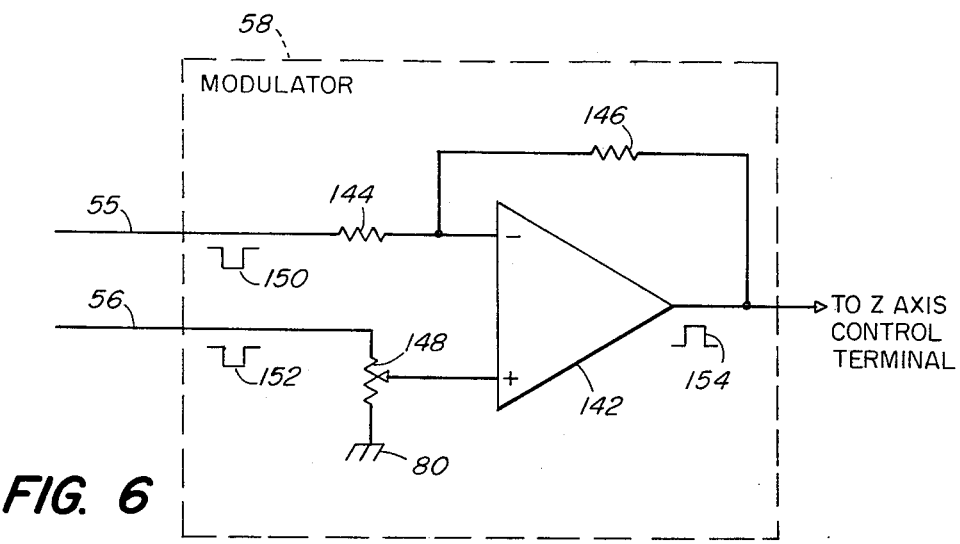
FIG. 6 is a block diagram of the display of FIG. 1 including the modulator thereof.

Referring now to FIG. 6, there is shown a diagram of the modulator 58 which comprises an amplifier 142, resistors 144 and 146 and a potentiometer 148. The resistor 144 couples signals along line 55 from the flip-flop 54 of FIG. 1 to the minus input terminal of the amplifier 142. The potentiometer 148 is utilized for coupling signals along line 56 from the sampler 39 of FIG. 1 to the plus input terminal of the amplifier 142. The resistor 146 is a feedback resistor coupling the output terminal of the amplifier 142 to the minus input terminal thereof. The potentiometer 148 is coupled between line 56 and ground 80 with its output being adjustable to permit the summation of a preselected fraction of the voltage on line 56 with the voltage on line 55.

The signal on line 55 is a negative pulse having a waveform 150 as shown in the figure. Similarly, the signal on line 56 has a negative pulse waveform 152 as shown in the figure. The waveform 152 is of varying amplitude depending on the position of scintillation on the scintillator 60 of FIG. 2 relative to the position of a photomultiplier 24. Thus, the output pulse signal of the amplifier 142, shown by the waveform 154, is of varying amplitude, the amplitude varying inversely with the amplitude of the waveform 152. Thus, when a scintillation on the scintillator 60 of FIG. 2 occurs near the center of a photomultiplier 24, the amplitude of the waveform 152 is increased while the amplitude of the waveform 154 is decreased. The display 46 may comprise a cathode-ray tube (CRT) in which case the positive pulse waveform 154 at the output of the amplifier 142 is coupled to an intensity control grid of the CRT.

Figure 7:
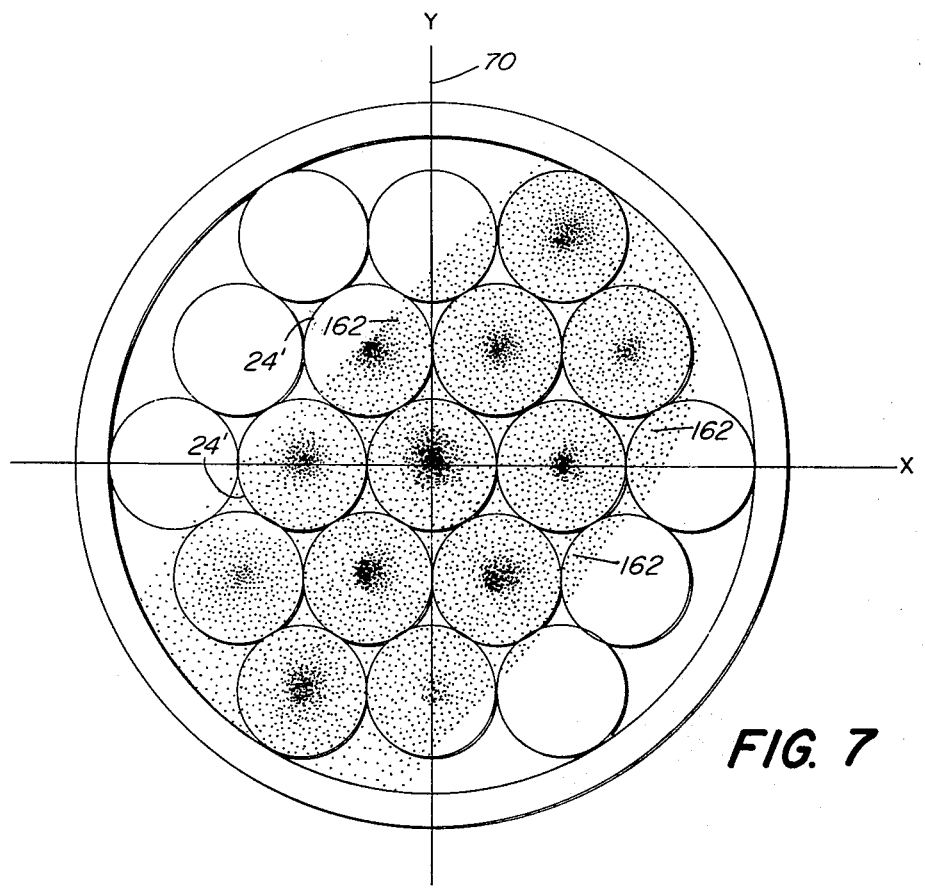
FIG. 7 is a view of the face of the display showing the increased density of points at locations corresponding to the centers of the photomultipliers.

Referring also to FIG. 7, the reference frame 70 of FIG. 2 is shown positioned upon the face of the display 46. The circles 24' are shown for indicating the positions of the corresponding photomultipliers 24 of FIG. 2. Individual points 162 corresponding to the positions of scintillations on the scintillator 60 of FIG. 2 are shown with increased density of these points 162 at the centers of the circles 24'. The output of the amplifier 142 modulates the Z axis and intensity of the display 46 to reduce the intensity of the points 162 in the central portions of the circles 24' thereby presenting a luminosity of the display 46 which appears uniform to an observer.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:
1. A camera system comprising:
an array of detectors of radiant energy positioned in a predetermined pattern for receiving such energy, each of said detectors providing a signal upon being illuminated with such energy;
means coupled to said detectors for combining signals of said detectors, said combining means including means for weighting signals of said detectors in accordance with the positions of individual ones of said detectors in said array to provide the coordinate positions of points in an image;
means coupled to said detectors for summing together signals of said detectors to provide a sum signal; and
display means coupled to said combining means for displaying said points of said image, said displaying means including a control electrode for varying the intensity of said displayed points, said sum signal of said summing means being coupled to said control electrode for modulating the intensity of said displayed points in accordance with their positions relative to an array of said detectors.

2. A system according to claim 1 wherein said modulation provides for a decreasing of intensity of such ones of said displayed points as are positioned at locations wherein there is an increased density of said points.

3. A system according to claim 2 wherein said weighting provides a scaling of individual ones of said detector signals inversely to the spacings between each of said detectors and a coordinate axis of said array.

4. A system according to claim 2 further comprising means responsive to signals of said detectors for providing a gate signal, and means coupled to said control electrode for subtracting said sum signal from said gate signal, said subtracting means applying the difference between said gate signal and said sum signal to said control electrode.

* * * * *